Nov. 18, 1947.  W. P. MANSFIELD ET AL  2,431,266
TWO-STROKE CYCLE INTERNAL-COMBUSTION ENGINE
Filed April 23, 1945  3 Sheets—Sheet 3
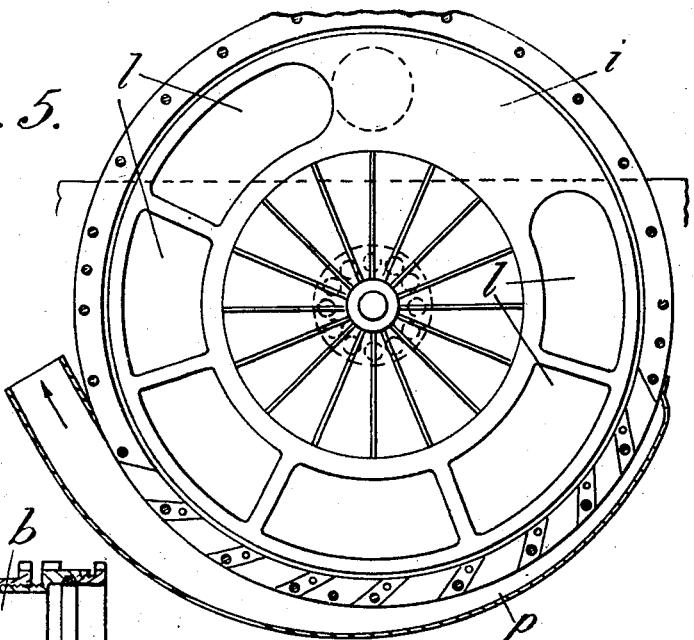
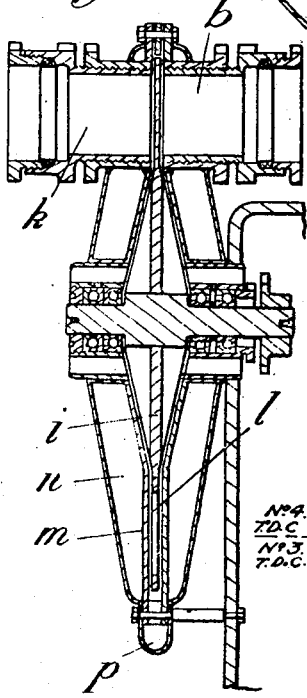
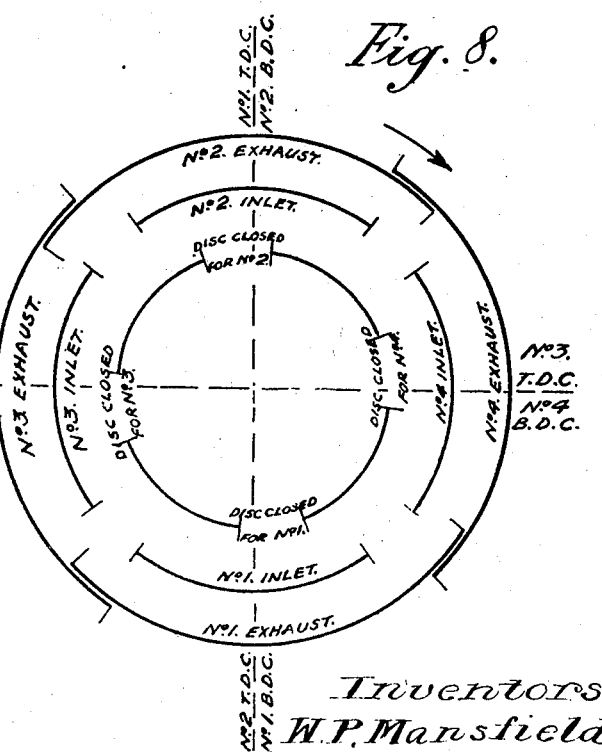
Inventors
W. P. Mansfield
J. White
By Glascock Downing Siebel
Attys

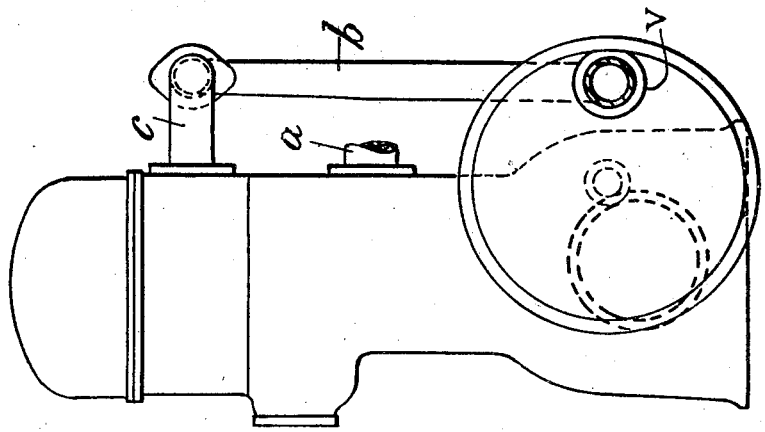
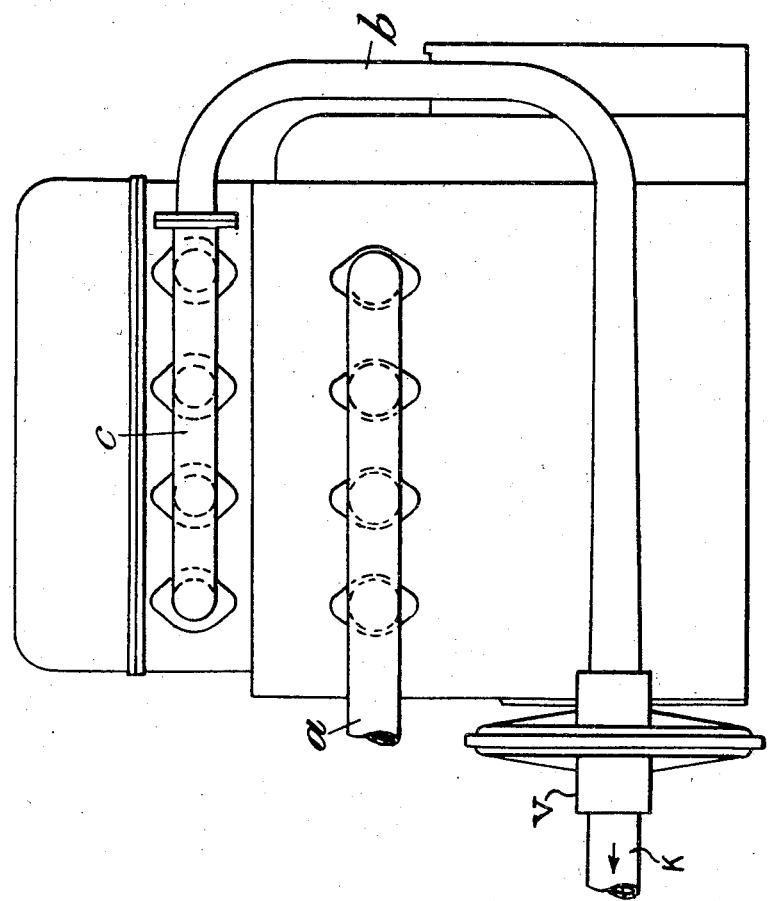

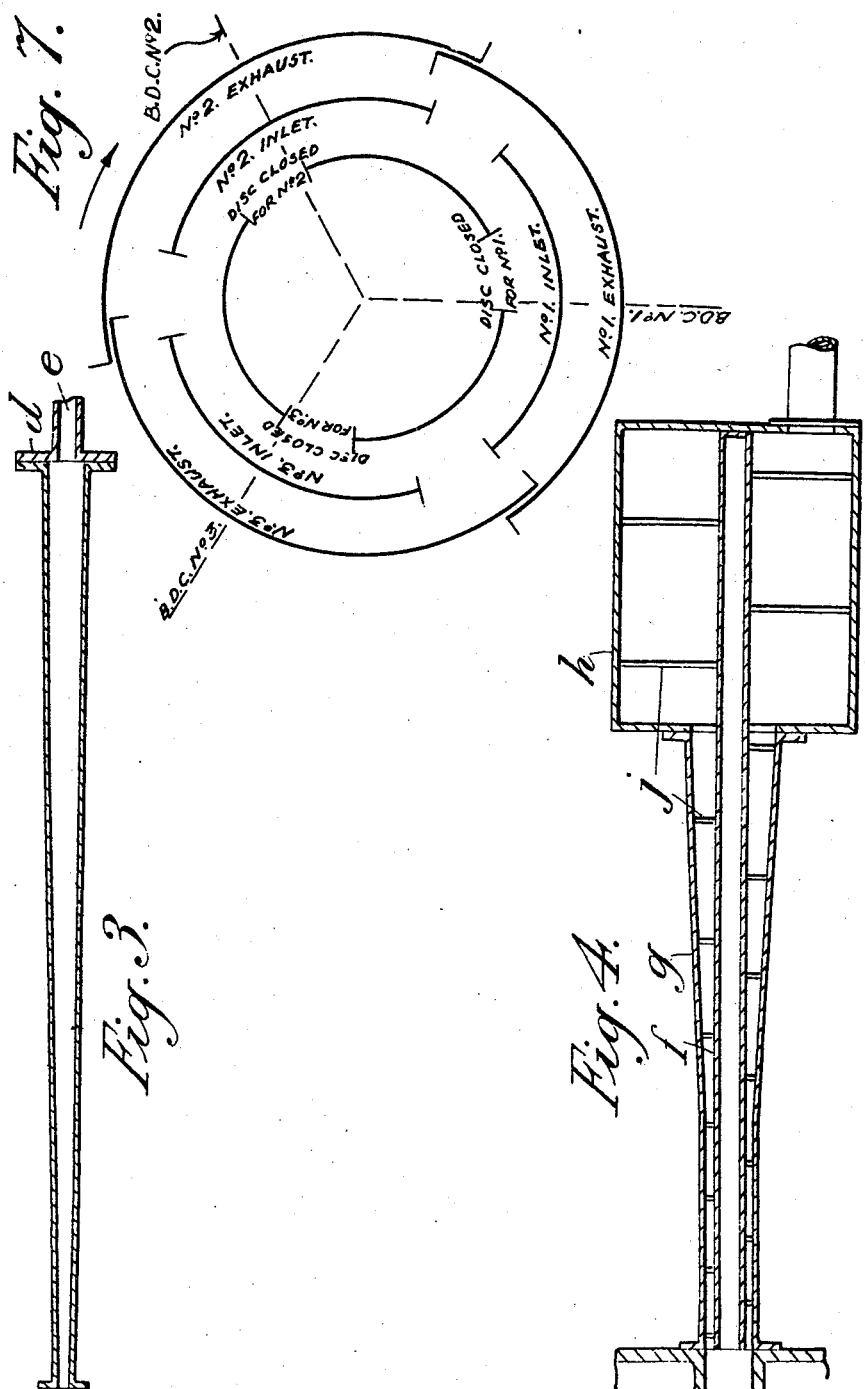

UNITED STATES PATENT OFFICE 2,431,266

TWO-STROKE CYCLE INTERNAL-COMBUSTION ENGINE

Wilfred Percival Mansfield and John White, Slough, England, assignors to Michel Kadenacy, Summit, N. J.

Application April 23, 1945, Serial No. 589,854
In Great Britain February 1, 1944

2 Claims. (Cl. 123—65)

This invention relates to two-stroke cycle internal combustion engines, with particular reference to the charging or supercharging of the same.

The object of the invention is to improve the efficiency of the charging or supercharging process, by utilisation of the energy of the exhaust gases.

In scavenging and charging the cylinders of two-stroke cycle internal combustion engines a pressure gradient, or movement of gas, is required between the inlet duct and the cylinder and between the cylinder and the exhaust duct. In self-induction engines this is achieved by reducing the pressure in the cylinder and exhaust duct below that of the atmosphere and in other engines by increasing the pressure in the inlet duct above that of the atmosphere.

For scavenging and charging the cylinder only a small pressure gradient is required, although this increases with engine speed, due to the reduced time available for the passage of the gases and the higher gas velocities thereby necessitated.

When the fresh charge is free air, and when little or no energy has been expended in compressing it, there is practically no loss in efficiency, however great the quantity of charge passed to the exhaust duct, and which takes no part in the ensuing combustion.

When the fresh charge is not free, or when considerable energy, at the expense of fuel, has been expended in compressing it to a relatively high pressure, only a limited quantity must pass to exhaust and take no part in the ensuing combustion, or the engine becomes inefficient and uneconomic.

If the pressure of supply of fresh charge is relatively low, the quantity passing to exhaust, will not be so great as to make the engine inefficient. As the pressure of supply is increased, in an endeavour to highly supercharge an engine, the loss to exhaust increases rapidly.

Early closure of the exhaust orifice can assist in controlling the loss to exhaust, but even with moderate pressure of supply the loss is still too great, unless the exhaust closes so early that it involves mechanical or other difficulties or complications.

An unsatisfactory compromise is to throttle the exhaust and raise the minimum and average pressures in the exhaust duct. While this method limits the escape of charge to exhaust and enables a relatively high pressure to be built up in the cylinder before the last orifice closes, it means that the total volume of scavenging and charging medium requires to be compressed to a pressure at least slightly greater than the exhaust pressure, with consequent increase in the work to be done by the compressor and thus in fuel consumption. Moreover the pressure in the cylinder when the last orifices close will be little, if any, higher than the pressure of supply, and may be lower.

A satisfactory method of limiting the loss of charge to exhaust is to cause a raised pressure to occur in the exhaust duct, adjacent the cylinder, only towards the end of the charging period. If the raised pressure occurs earlier it will interfere with the scavenging and increase the back pressure, with similar detrimental effects to those mentioned above.

Moreover the said raised pressure in the exhaust duct can be arranged to attain a relatively high value, higher than the normal pressure of supply, and, by return of fresh charge from the exhaust duct into the cylinder, cause a very considerable degree of supercharging. Experiments have shown that under these circumstances very little mixing occurs between the fresh and foul gases during the short time available, and that such mixing as occurs is limited to a small zone marking the junction between the two masses of gas.

A volume of charge in excess of that required for charging or supercharging should be provided so that a proportion of the fresh charge which passes through the cylinder and enters the exhaust duct, remains therein at the end of the charging period, and takes no part in the ensuing combustion process. The excess quantity should be of the order of 0.15 to 0.6 cylinder volume at N. T. P.

The pressure fluctuations required in the exhaust duct adjacent the cylinder, are a relatively low pressure during the major portion of the charging period and a raised pressure towards the end of the said period.

This may be attained by a suitable arrangement and/or control of the exhaust duct, and of the timing of the engine, which will be described in detail later.

Upon the opening of the exhaust orifice, with a high time area, an intense solitary moving wave or bore, formed by the energy originally in the cylinder gases, will move outwardly along the exhaust duct. This wave, being of finite amplitude, will become steep fronted by propagation, and will travel faster than lesser disturbances, so that its outward motion is unaffected by the presence of an obstruction ahead of it, until the obstruction is actually met.

If the exhaust duct is longer than the said moving pressure wave, then, during this outward movement, the pressure in the duct behind the wave, and in the cylinder, will fall to substantially the pressure of the medium through which the wave has moved. Advantage may be taken of the known self-induction effect, whereby the pressure may be still further reduced, and a tapered exhaust duct or steps, i. e., sudden increases in cross-sectional area of the duct, may be provided. The pressure distribution in the duct, when the outwardly moving wave reaches the outer end thereof, comprises a zone of low pressure adjacent the inner end and a zone of high pressure adjacent the outer end. The extent of the zone of high pressure, and its absolute pressure, will depend upon the pressure in the cylinder when the exhaust orifices open, the cross-sectional areas of the duct, and the rate of discharge of the gases from the cylinder, that is, the time area of the exhaust orifices and their co-efficient of discharge.

If an obstruction or reflecting surface is provided at the outer end of a pipe of suitable length, all or a portion of the energy contained in the outwardly moving wave or bore, (depending upon whether the obstruction forms a blind or closed end or only a partially blind or closed end), will be returned or reflected from the said obstruction back to the cylinder, to reach the latter towards the end of the charging period. Such an obstruction forming a closed end in the pipe may be provided by a valve, which, in one position, closes the pipe and, in another, permits passage of the gases therethrough.

In the present invention the principal consideration is the movement and distribution of the energy carried by the waves rather than the movement of the gases themselves.

It will be seen, therefore, that on the basis of the above considerations, including a suitable arrangement of the various features of the engine, it is possible to approximate to the ideal cycle involving charging at low pressure and supercharging at high pressure after low pressure charging is completed. By maintaining a low absolute pressure in the cylinder and exhaust duct during the major portion of the charging period, the cylinder can be scavenged and charged against this low back pressure, thus incurring a small expenditure of energy, and can be finally charged or supercharged, even to a very considerable degree, by the raised pressure or return action in the exhaust duct. Moreover, energy normally wasted is utilised in compressing the charge or supercharge.

It will be appreciated that as the mean effective pressure of an engine is increased, the pressure of gases in the cylinder when the exhaust orifices open is also increased, for any given timing and arrangement of the engine. This provides the possibility of attaining a higher pressure in the exhaust duct towards the end of the charging period, and thus of increasing the degree of supercharging, in order to support a still further increased mean effective pressure until the optimum for the engine, due to other causes, is reached.

Accordingly the invention consists in a two-stroke cycle internal combustion engine in which the quantity of fresh charge passed into the cylinder is in excess of that required for charging or supercharging the cylinder, whereby a predetermined quantity passes through the cylinder into the exhaust duct, and in which the said exhaust duct is constructed, arranged or controlled so that, following each exhaust action or pressure phase, a relatively low pressure exists therein adjacent the cylinder during the major portion of the charging period, in order to facilitate scavenging and charging, and in which an obstruction is provided in the exhaust duct, at such a distance from the exhaust orifices that the return or positive reflection therefrom, of energy originally contained in the cylinder gases, causes a raised pressure to occur at the exhaust orifice towards the end of the charging period, whereby further escape of fresh charge into the said duct is prevented, or a portion of the said fresh charge which has passed into the duct is compressed and returned into the cylinder to form a supercharge.

Further features of the invention will be pointed out in the appendant claims.

Practical applications of the invention will now be described by way of example only with reference to the accompanying drawings, in which:

Figure 1 is a side elevation of an engine constructed and arranged in accordance with the invention;

Figure 2 is an end view of Figure 1;

Figure 3 is a section of one form of exhaust duct that may be employed;

Figure 4 is a section of a modified form of exhaust system;

Figure 5 is an elevation of a form of disc valve that may be used;

Figure 6 is a cross-sectional elevation of Figure 5, and

Figures 7 and 8 are suitable timing diagrams for a 3-cylinder and a 4-cylinder engine, respectively.

The mechanical arrangement of the engine may follow any desired arrangement known in the art, and, if desired, a blower or compressor may provide the low pressure scavenging and charging medium. Figures 1 and 2 show a 4-cylinder two-stroke cycle internal combustion engine, having an air inlet duct $a$ from the blower (not shown), and the exhaust duct $b$ leading from the exhaust manifold $c$. A cyclically operated valve designated $v$ is mounted in the exhaust duct and a duct $k$ leads from the valve to the atmosphere or silencer.

The actions in the exhaust duct must be coordinated with the timing of the engine. In the preferred arrangement the exhaust orifices will close later than the inlet orifices, by the amount necessary to ensure that when the inlet orifices are fully closed, a sufficient area of exhaust orifices is still open to enable the energy in the returning action or wave to compress some of the fresh charge, which has passed through the cylinder into the exhaust duct, and deliver it into the cylinder, thereby supercharging the latter.

By this method the compression of the fresh charge to the required supercharging pressure is carried out after the low pressure charging process is completed.

According to the present arrangement it is unnecessary to have the charging medium at the same pressure as that required in the cylinder when the last orifices close, since the supercharging is completed by the exhaust return action or wave. Moreover only a low pressure of fresh charge is necessary to sweep out and re-charge the cylinder, since the pressure in the cylinder, and in the exhaust duct adjacent the cylinder, is low during these operations.

By way of example an exhaust overlap of 10 to 20 degrees is satisfactory for medium speed engines, and the return energy or wave should preferably reach the exhaust orifices about the beginning of the overlap period, or even about 2 degrees to 6 degrees before the inlet orifices close. Less overlap may be satisfactory for low speed engines, while more may be required for very high speed engines. This value will vary with the different types of engines, but the above indications will suffice to obtain an improved result, the optimum result for any particular engine being ascertained in the usual manner.

In arranging the timing of the engine due regard must be given, particularly in high speed engines, to the diametrically opposed requirements of a high time area value for the inlet and exhaust orifices, in order to pass the required quantities of gases in the short time available, and the equally important feature of retaining the maximum effective stroke.

While the timing of the engine is preferred in which the exhaust orifices close later than the inlet orifices, it should be noted that a useful effect can still be obtained when these orifices close substantially at the same time, and even if the exhaust orifices close a little earlier than the inlet orifices. With such arrangements, more satisfactory results will be obtained if the exhaust and inlet orifices are at opposite ends of the cylinder, than if the two sets of orifices are at the same end of the cylinder.

The cross-sectional area of the exhaust duct $b$ should be at least equal to, and preferably 20% to 50% greater than, the area of exhaust orifice opened before the inlet orifices open. The smaller the cross-section of the duct, provided it is not so small that it restricts the motion of the gases too greatly, the higher will be the pressure of the gases returned to the cylinder.

The length of the duct, between the exhaust orifices and an obstruction provided on the said duct, should be such that the returning energy, in the form of a return action or wave, reflected from the said obstruction, reaches the exhaust orifice towards the end of the charging period.

Calculation of the length of the exhaust duct should be based on a mean velocity of the outward and return waves of the order of 450 to 600 metres per second. This velocity is dependent upon the energy in the gases when the exhaust orifices open, the time area of the orifices, the shape and form of the orifices, i. e., the orifice co-efficient of discharge, and the areas and form of the exhaust duct, including bends, etc. Broadly the lower value is applicable to low speed engines having small exhaust area and the higher value to high speed engines having large exhaust area, but allowance must be made for the other factors mentioned. Calculations on this basis will ensure that the length of the duct will be such that the returning wave reaches the exhaust orifices towards the end of the charging period. The optimum length of the duct will be indicated by the performance of the engine and by the pressure and purity of the charge in the cylinder when the last orifice closes, but more detailed information can be obtained from pressure diagrams and analysis of strobometrically obtained gas samples, all taken closely adjacent the exhaust orifices. Such optimum length will be approximately inversely proportional to the speed of the engine, but if the length is arranged to suit the speed at which maximum output is required, a useful effect will be obtained over a substantial speed range in the case of a variable speed engine. Any arrangement for altering the effective length of the exhaust duct may be used.

Figure 3 shows a simple form of tapered exhaust duct partially closed by the flange $d$ so as to give a reflecting surface, the area of which is about 60 per cent of the area at the outer end of the duct. In this form it is desirable to have a pipe $e$ of the same diameter as the outlet in continuation of the latter, to avoid further reflection actions interfering with the pressure distribution required in the duct. The length of the pipe $e$ may be such as to synchronise the actions therein, with those in the duct.

Figure 4 shows an alternative arrangement of exhaust duct in which the closed portion of the duct is maintained separate from the open end portion by carrying the separate closed end pipe $f$ through the centre of the open end pipe $g$, the relative positions being maintained by streamlined stays $j$. The proportion of the energy which passes to the closed end and to the open end, respectively, is controlled by the area of the inlet to each pipe. In the drawing the areas at the inlet end of the duct are about equal. It will be noted that the open end pipe is shorter than the closed end pipe, so that the reflection action from the open end returns to the cylinder, before the reflection from the closed end. By arrangement of the length of the two pipes the reflection action from the open end can have its full effect in assisting the charging of the cylinder, and will be substantially completed before the arrival of the reflection action from the closed end, which will cause an increase in pressure and return of charge to the cylinder to effect supercharging. This arrangement permits the use of the reflection action from the open end, at the expansion chamber $h$, in addition to the progressive reflection action from the tapered pipe; whereas in the arrangement shown in Figure 3 the reflection actions are confined to those caused by the tapered pipe alone.

Another embodiment of the invention comprises the arrangement, at the outer end of the duct, of a cyclically operated valve, timed to be fully closed while the reflecting action takes place, and then to open, e. g., to the full area of the duct, and permit the escape of the gases, so that the pressure in the duct will fall to substantially atmospheric pressure before the next exhaust action occurs. The said valve means may open immediately the reflected action or wave is completed or substantially completed, because when the return wave is formed, and is in movement back towards the cylinder, the opening of the valve will not effect its return movement.

One convenient form of cyclically operated valve at the outer end of the exhaust duct is shown in detail in Figures 5 and 6 and comprises a rotating disc valve $i$ driven from the engine at engine speed, or at any suitable multiple or sub-multiple thereof. (The form shown in the drawings is designed to run at three times engine speed.) The duct $b$ from the exhaust orifices will lead to one face of the disc, and a duct $k$ to the atmosphere or silencer will be led away from the other face.

Ports or orifices $l$ provided in the disc will be designed to give the required open and closed periods.

A housing $m$ will enclose the valve, but it is not necessary for the housing to provide an air-tight joint or even to be in contact with the disc, since the quantity of gas which can leak past the valve in the short time available will not be serious, even if the gas is at high pressure. Nevertheless the working clearances should be maintained as small as possible. The disc valve may be internally or externally cooled by any suitable medium, e. g., air, water, oil, etc. In the drawing, the space $n$ is shown for cooling medium. Gas leaking past the disc may be collected in a duct such as that shown at $p$, and conveyed to the silencer or tail pipe.

The design of this rotating disc valve presents no serious temperature difficulties, since no part is subject to the high temperature of exhaust for more than a small portion of the cycle. Although providing sufficiently rapid opening and closing of the orifices, the speed of rotation need not be so high as to introduce serious stress difficulties.

In cases where an extra high speed of opening may be required, two discs rotating in opposite directions may be employed.

Where compactness is essential, the duct between the engine and the rotating disc valve may be doubled up, coiled, or otherwise arranged around the engine, and take any convenient form of cross section. When it is required that the engine should operate over a wide range of working speeds or loads, adjustable timing of the rotating disc valve, relative to the engine driving shaft, may be provided, and may be controlled in dependence upon the load and/or speed of the engine.

It will be understood that any other type of engine driven valve may be used which gives the opening and closing characteristics specified above.

While the foregoing description is broadly applicable to engines with any number of cylinders, there are certain further arrangements which may be employed with multi-cylinder engines, and additional precautions which should be observed.

In multi-cylinder engines good results will be obtained with a separate exhaust duct for each cylinder, but this is not essential provided certain precautions are observed. For example the exhaust from one cylinder into a manifold should not raise the pressure in the exhaust branch of the preceding cylinder in the firing order, at a time when low pressure is desired therein to facilitate the scavenging and charging of the said preceding cylinder.

It follows that if the charging period is of the order of 120 degrees, then not more than 3 cylinders should exhaust into the same duct, while if the charging period is of the order of 90 degrees, then 4 cylinders may exhaust into the same duct. Some small overlap of the exhaust periods is advantageous, since the increase in pressure due to the following cylinder exhausting supplements the action of the returning wave, provided it occurs towards the end of the charging period of the preceding cylinder. In engines having more than 3 or 4 cylinders, unless the charging period is unusually short, it is necessary to have more than one exhaust manifold and duct.

Figure 7 shows a suitable timing diagram for a 3-cylinder engine, and Figure 8 shows a timing diagram for a 4-cylinder engine. These diagrams are also suitable in the case where the disc valve is not used, in which case the inner circle would be omitted from the diagrams.

In order to ensure concentration of the energy of the returning wave into the cylinder in which the exhaust orifice is open, it is important that the exhaust manifold should be as compact as possible, and the passages in the engine or cylinder block short. For this reason the overlap of the exhaust and inlet periods in the cylinders served by the same exhaust manifold should not be so great that foul gases from a cylinder in which the exhaust orifices are just opening can enter a cylinder in which the exhaust orifices are just closing, and displace fresh charge back out of the inlet orifices. Preferably the volume of the passage $f$ in the cylinder block or head plus the volume of the short separate pipe or branch $g$, before joining the manifold $e$ proper (or the branch from any other cylinder), should exceed the volume of fresh charge which it is desired to pass back into the cylinder for supercharging purposes. The volume of charge passed back to the cylinder should be less than the total volume of fresh charge passed through to the exhaust duct. These precautions ensure that the fresh charge returned to the cylinder for supercharging is not contaminated by the exhaust from the following cylinder or by the return action.

In the case of multi-cylinder engines the cyclically operated rotating disc valve may be mounted at the front or rear end of the cylinder block with the exhaust manifolds brought forward or backwards respectively into a housing surrounding said disc valve, ports or orifices in the disc being designed to give the timing specified above. More than one manifold may be controlled by the same rotating disc valve provided they are spaced at the necessary angular separation, or the orifices in the valve are positioned and designed to give the correct timing.

The disc valve may be driven in any suitable way, for example, from the crankshaft or camshaft of the engine at the same or any suitable multiple or submultiple of the speed of said shafts. Any number of disc valves may be used.

If it is desired to operate the engine without supercharging in the form herein described, means may be provided for by-passing the gases so that they do not pass through the rotating disc valve. Alternatively, means such as a synchro-mesh gear or clutch may be provided in the drive for the rotating disc valve which should ensure that the said valve becomes stationary in the fully open position and that the correct timing is maintained when rotation is re-commenced.

We claim:

1. A two-stroke cycle internal combustion engine comprising a cylinder having inlet and exhaust orifices, control means for the orifices operating to produce explosive exhaust of burned gases as a mass from the cylinder followed by implosive inlet of a fresh gaseous charge, said means causing the exhaust orifices to close later than the inlet orifices, an exhaust conduit providing a free passage for the movement of the burned gases, a valve in the exhaust conduit operable in closed position to provide a surface from which the energy contained in the burned gases may be reflected toward the cylinder, the valve in open position providing a free passage for the gases, and means for operating the valve in timed relation to the control means for said orifices to reflect energy traveling toward the valve from the cylinder during exhaust and to cause the valve to be opened when the reflecting action is completed, the valve being at such a distance from the cylinder that the energy reflected therefrom reaches the exhaust orifices toward the end of the charging period.

2. A two-stroke cycle internal combustion engine comprising a cylinder having inlet and exhaust orifices, control means for the orifices operating to produce explosive exhaust of burned gases as a mass from the cylinder followed by implosive inlet of a fresh gaseous charge, said means causing the exhaust orifices to close later than the inlet orifices, an exhaust conduit providing a free passage for the movement of the burned gases, a valve in the exhaust conduit operable in closed position to provide a surface from which the energy contained in the burned gases may be reflected toward the cylinder, the valve in open position providing a free passage for the gases, and means for operating the valve in timed relation to the control means for said orifices to reflect energy traveling toward the valve from the cylinder during exhaust and to cause the valve to be opened when the reflecting action is completed, the valve including a rotating disc mounted for rotation on an axis outside the exhaust conduit and extending across the conduit, the valve being at such a distance from the cylinder that the energy reflected therefrom reaches the exhaust orifices toward the end of the charging period.

WILFRED PERCIVAL MANSFIELD.
JOHN WHITE.

REFERENCES CITED

The following references are of record in the file of this patent:

UNITED STATES PATENTS

| Number | Name | Date |
|---|---|---|
| 2,281,585 | Kadenacy | May 5, 1942 |

FOREIGN PATENTS

| Number | Country | Date |
|---|---|---|
| 431,857 | England | 1935 |
| 442,940 | England | 1936 |
| 324,323 | England | 1930 |
| 537,040 | England | 1941 |